United States Patent
Li et al.

(10) Patent No.: US 9,165,158 B2
(45) Date of Patent: Oct. 20, 2015

(54) ENCRYPTION KEY MANAGEMENT USING DISTRIBUTED STORAGE OF ENCRYPTION-KEY FRAGMENTS

(75) Inventors: Jun Li, Mountain View, CA (US); Ram Swaminathan, Cupertino, CA (US); Alan H. Karp, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 51 days.

(21) Appl. No.: 13/817,345

(22) PCT Filed: Aug. 17, 2010

(86) PCT No.: PCT/US2010/045768
§ 371 (c)(1),
(2), (4) Date: Feb. 15, 2013

(87) PCT Pub. No.: WO2012/023929
PCT Pub. Date: Feb. 23, 2012

(65) Prior Publication Data
US 2013/0177157 A1    Jul. 11, 2013

(51) Int. Cl.
*H04L 9/08* (2006.01)
*G06F 21/62* (2013.01)

(52) U.S. Cl.
CPC .............. *G06F 21/6218* (2013.01); *H04L 9/08* (2013.01); *H04L 9/083* (2013.01); *H04L 9/085* (2013.01); *H04L 9/0894* (2013.01)

(58) Field of Classification Search
None
See application file for complete search history.

(56) References Cited

U.S. PATENT DOCUMENTS

| | | | |
|---|---|---|---|
| 6,272,632 B1 * | 8/2001 | Carman et al. | 713/168 |
| 7,231,528 B1 | 6/2007 | Yasukura | |
| 8,015,211 B2 * | 9/2011 | Marceau et al. | 707/802 |
| 8,051,205 B2 * | 11/2011 | Roy et al. | 709/244 |
| 8,170,784 B2 * | 5/2012 | Kindberg | 701/438 |
| 2002/0188855 A1 * | 12/2002 | Nakayama et al. | 713/186 |
| 2003/0147535 A1 * | 8/2003 | Nadooshan et al. | 380/277 |
| 2010/0172501 A1 * | 7/2010 | Tian et al. | 380/277 |

FOREIGN PATENT DOCUMENTS

KR    10-2009-0065136 A    6/2009

OTHER PUBLICATIONS

A Soo-Young Kang et al ."A Study on Low-Cost RFID System Mutual Authentication Scheme using Key Division", Journ Information Processing Society. Aug. 2007 14/5 431-438.
International Search Report and Written Opinion for PCT Application No. PCT/2010/045768, dated May 26, 2011, pp. 8.
Jonghu Lee, et al, "Designing of the Distributed Key Management System or Protecting Medical Information", Conf. of Korean Society for Internet Information .06/ 2010.429-434.

* cited by examiner

*Primary Examiner* — Gilberto Barron, Jr.
*Assistant Examiner* — Wayne An
(74) *Attorney, Agent, or Firm* — Rathe Lindenbaum LLP (57) ABSTRACT

An encryption key fragment is divided into a number of encryption key fragments. Requests to store different ones of the encryption key fragments are transmitted to different computer memory storage systems. An individual request to store an encryption key fragment includes one of the encryption key fragments and bears an access control hallmark for regulating access to the encryption key fragment.

20 Claims, 6 Drawing Sheets

ENCRYPTION KEY MANAGEMENT USING DISTRIBUTED STORAGE OF ENCRYPTION-KEY FRAGMENTS

FIELD

This disclosure is related to encryption key management.

BACKGROUND

Many on-line applications and services store and/or require access to sensitive data such as, for example, medical records and credit card information. In order to keep such sensitive data secure, on-line applications and services often store such sensitive data in an encrypted format.

Cryptographic algorithms may use encryption keys to encrypt data. Specifically, an encryption key may determine the functional output of a cryptographic algorithm. As such, an encryption key may be used to transform a piece of data from an unencrypted format into an encrypted format. Likewise, the encryption key may be used to transform the piece of data from its encrypted format back to its unencrypted format.

SUMMARY

According to one general aspect, a data object that is associated with an identifier is encrypted using an encryption key. The encryption key is divided into a first number, n, of encryption key fragments according to an algorithm that enables reconstruction of the encryption key from a second number, k, of the encryption key fragments. k is less than or equal to n. Requests to store different ones of the encryption key fragments then are transmitted to different computer memory storage systems. Each such request to store an encryption key fragment includes one of the encryption key fragments and an indication of the identifier associated with the data object. In addition, each request bears an access control hallmark for regulating access to the encryption key fragment.

Implementations may include one or more of the following features. For example, requests to store each of the n encryption key fragments may be transmitted to the computer memory storage systems.

Additionally or alternatively, requests to retrieve encryption key fragments corresponding to the identifier associated with the data object may be transmitted to the computer memory storage systems. Each such request to retrieve encryption key fragments may bear an appropriate access control hallmark demonstrating authorization to access the encryption key fragments. Responsive to transmitting the requests to retrieve encryption key fragments to the computer memory storage systems, at least k of the encryption key fragments may be received from various of the computer memory storage systems, and the encryption key may be reconstructed from the at least k received encryption key fragments. In addition, a request to access the data object may be received, and the requests to retrieve the encryption key fragments corresponding to the identifier associated with the data object may be transmitted responsive to receiving the request to access the data object. It also may be determined that the data object is related to other encrypted data objects associated with other corresponding identifiers and for which encryption key fragments have been distributed to the computer memory storage systems. Therefore, as a consequence of having received the request to access the data object and having determined that the data object is related to the other encrypted data objects and without yet having received requests to access the other encrypted data objects, requests to retrieve encryption key fragments corresponding to the identifiers associated with the other encrypted data objects may be transmitted to the computer memory storage systems. Each such request to retrieve encryption key fragments may bear an appropriate access control hallmark demonstrating authorization to access the encryption key fragments.

In some implementations, the encryption key may be divided into the encryption key fragments according to a secret sharing algorithm that enables reconstruction of the encryption key from k of the encryption key fragments, where k is less than n. In other implementations, the encryption key may be divided into encryption key fragments according to an erasure coding algorithm that enables reconstruction of the encryption key from k of the encryption key fragments, where k is less than n.

Furthermore, a unique identifier may be maintained for each of the different computer memory storage systems and, for each of the different computer memory storage systems, a hashing algorithm may be applied to a combination of the identifier associated with the data object and the unique identifier for the computer memory storage system to generate a unique coded value for the computer memory storage system. In such implementations, a request to store an encryption key fragment may include the unique coded value for the computer memory storage system. Alternatively, the requests to store the encryption key fragments may be signed using a private key associated with a computing system.

In some implementations, the identifier associated with the data object may be a uniform resource identifier (URI). Additionally or alternatively, the different computer memory storage systems may be different data centers that are different from and physically remote from each other. In such implementations, n different requests to store an individual one of the encryption key fragments, each including a different one of the n encryption key fragments, may be transmitted to n different data centers.

The encryption key may be stored in a transient computer memory storage system. Confirmations from some number of the data centers to which requests to store encryption key fragments were transmitted may be received confirming that the corresponding encryption key fragments have been stored. Thereafter, it may be determined that confirmations that the corresponding encryption key fragments have been stored have been received from a sufficient number of the data centers to which a request to store an encryption key fragment was transmitted, and, as a consequence, the encryption key may be deleted from the transient computer memory storage system.

Additionally or alternatively, after the requests to store the encryption key fragments have been transmitted to the different data centers, requests to delete encryption key fragments corresponding to the identifier associated with the data object may be transmitted to the different data centers. Responsive to the requests to delete encryption key fragments corresponding to the identifier associated with the data object being transmitted to the different data centers, confirmations may be received from data centers to which requests to delete encryption key fragments corresponding to the identifier associated with the data object were transmitted confirming that encryption key fragments corresponding to the identifier associated with the data object have been deleted, and it may be determined that confirmations that encryption key fragments corresponding to the identifier associated with the data object have been received from a sufficient number of the data centers to which requests to delete encryption key fragments were sent so that the encryption key cannot be reconstructed.

According to another general aspect, a system includes multiple data centers that are different from and physically remote from each other. Each data center includes one or more data center processing elements, and data center computer memory storage. Each data center computer memory storage stores instructions that, when executed by the one or more data center processing elements, cause the one or more data center processing elements to receive requests to store encryption key fragments in the data center memory storage from a computing sub-system that provides an application that involves data management. Individual ones of these requests to store encryption key fragments bear access control hallmarks of the computing sub-system and include both an encryption key fragment for storage and an associated indication of an identifier corresponding to a data object that was encrypted using an encryption key from which the encryption key fragment was derived. In addition, each data center computer memory storage also stores instructions that, when executed by the one or more data center processing elements, cause the one or more data center processing elements to store the particular encryption key fragment and the indication of the identifier corresponding to the data object in the data center memory storage in a manner that reflects the access control hallmark of the computing sub-system and the association between the particular encryption key fragment and the indication of the identifier corresponding to the data object. Further, each data center computer memory storage stores instructions that, when executed by the one or more data center processing elements, cause the one or more data center processing elements to receive requests to retrieve encryption key fragments associated with a specific data object that bear access control hallmarks of the computing sub-system and that include indications of an identifier corresponding to the specific data object that was encrypted using an encryption key from which the encryption key fragment was derived from the computing sub-system. Each data center computer memory storage also stores instructions that, when executed by the one or more data center processing elements, cause the one or more data center processing elements to determine if an encryption key fragment associated with the indication of the identifier corresponding to the specific data object is stored in the data center computer memory storage, determine, based on the access control hallmark of the computing sub-system that the computing sub-system is authorized to retrieve the encryption key fragment associated with the indication of the identifier corresponding to the specific data object, and transmit, to the computing sub-system, the encryption key fragment associated with the indication of the identifier corresponding to the specific data object. The system also includes a computing sub-system configured to provide an application that involves data management. The computing sub-system includes one or more computing sub-system processing elements and computing sub-system computer memory storage that stores instructions that, when executed by the one or more computing sub-system processing elements, cause the one or more computing sub-system elements to receive requests to store data objects from electronic communications devices. In addition, the computing sub-system computer memory storage stores instructions that, when executed by the one or more computing sub-system processing elements, cause the one or more computing sub-subsystem processing elements to, responsive to receiving a request to store a particular data object, encrypt the particular data object using an encryption key, transmit the encrypted data object to a computer memory storage system, divide the encryption key into a first number, n, of encryption key fragments according to an algorithm that enables reconstruction of the encryption key from a second number, k, of the encryption key fragments, and transmit requests to store individual ones of the n encryption key fragments to different ones of the multiple data centers. Each such request to store an individual one of the n encryption key fragments bears an access control hallmark of the computing sub-system and includes the individual encryption key fragment and an indication of an identifier associated with the particular data object. Further, the computing sub-system computer memory storage stores instructions that, when executed by the one or more computing sub-system processing elements, cause the one or more computing sub-subsystem processing elements to receive requests to access data objects from electronic communications devices, and, responsive to receiving a request to access a certain data object, transmit requests to retrieve encryption key fragments associated with indications of an identifier corresponding to the certain data object to the multiple data centers. Each such request to retrieve an encryption key fragment bears an access control hallmark of the computing sub-system and includes an indication of the identifier corresponding to the certain data object. The computing sub-system computer memory storage also stores instructions that, when executed by the one or more computing sub-system processing elements, cause the one or more computing sub-system processing elements to receive at least k of the encryption key fragments associated with the indication of the identifier corresponding to the identifier of the certain data object from various of the multiple data centers, use the at least k received encryption key fragments to reconstruct the encryption key, access the encrypted certain data object, use the reconstructed encryption key to decrypt the certain data object, and provide the electronic communications device that requested access to the certain data object with access to the decrypted certain data object.

According to still another general aspect, a data object is encrypted using an encryption key and the encryption key is divided into a number of encryption key fragments. Identifiers for each of a first computer memory storage system and a second computer memory storage system that is different from the first computer memory storage system are accessed. The identifier for the first computer memory storage system is different than the identifier for the second computer memory storage system. A hashing algorithm then is applied to a first value representing a combination of an identifier associated with the encrypted data object and the identifier for the first computer memory storage system to generate a first hash value, and the hashing algorithm is applied to a second value representing a combination of the identifier associated with the encrypted data object and the identifier for the second computer memory storage system to generate a second hash value. A first one of the encryption key fragments and the first hash value is distributed to the first computer memory storage system for storage at the first computer memory storage system, and a second one of the encryption key fragments and the second hash value is distributed to the second computer memory storage system for storage at the second computer memory storage system. Thereafter, a request to access the data object is received. Responsive to receiving the request to access the data object, a request for the first encryption key fragment that includes the first hash value is sent to the first computer memory storage system, and a request for the second encryption key fragment that includes the second hash value is sent to the second computer memory storage system. The first and second encryption key fragments then are received, and the encryption key is reconstructed based at least in part on the first and second encryption key fragments. In addition, the encrypted data object is encrypted using the reconstructed encryption key.

The various aspects, implementations, and features disclosed may be implemented using, for example, one or more of a method; an apparatus; a system; an apparatus, system, tool, or processing device for performing a method; a computer program or other set of instructions stored on a tangible computer-readable storage medium; and an apparatus that includes a program or a set of instructions stored on a computer-readable storage medium.

DETAILED DESCRIPTION

When encryption keys are used to encrypt data objects, encryption key management techniques may be employed to maintain the encryption keys securely while at the same time enabling efficient and reliable access to the encryption keys in order to enable decryption of the data objects when desired. Such encryption key management may be challenging when a large number of data objects (e.g., several billion) are involved and each data object has its own unique key.

One example of a challenge that may be encountered in the area of encryption key management is implementing a scalable encryption key store that is both highly secure and highly reliable, such that the encryption key store can tolerate some amount of data center-level failure events (e.g., communication failures, data corruptions, power outages, or even natural disasters like an earthquake) and/or some level of security breach (e.g., machines in a data center being hacked by cyber intruders). Another example of a challenge that may be encountered is effectively managing the expiration of encryption keys at the end of the lifetime of the data objects to which the encryption keys correspond.

As disclosed herein, a large-scale encryption key store may be implemented across multiple data centers. Individual encryption keys may be partitioned into multiple encryption key fragments that then are stored in different ones of the data centers. According to this scheme, a single master key may not be required to protect the encryption keys, and the configuration of the distributed encryption key store may make it impractical for individual data centers storing encryption key fragments to collude to reconstruct complete encryption keys. In addition, access controls may be built into the mechanisms for retrieving and/or deleting the individual fragments of encryption keys, thereby providing an additional or alternative layer of protection against unauthorized reconstruction of the encryption keys. Furthermore, the techniques that are used to partition the encryption keys into encryption key fragments may enable reconstruction of encryption keys even in the face of data center-level failures, while also providing some measure of security against data center-level security breaches.

Figure 1:
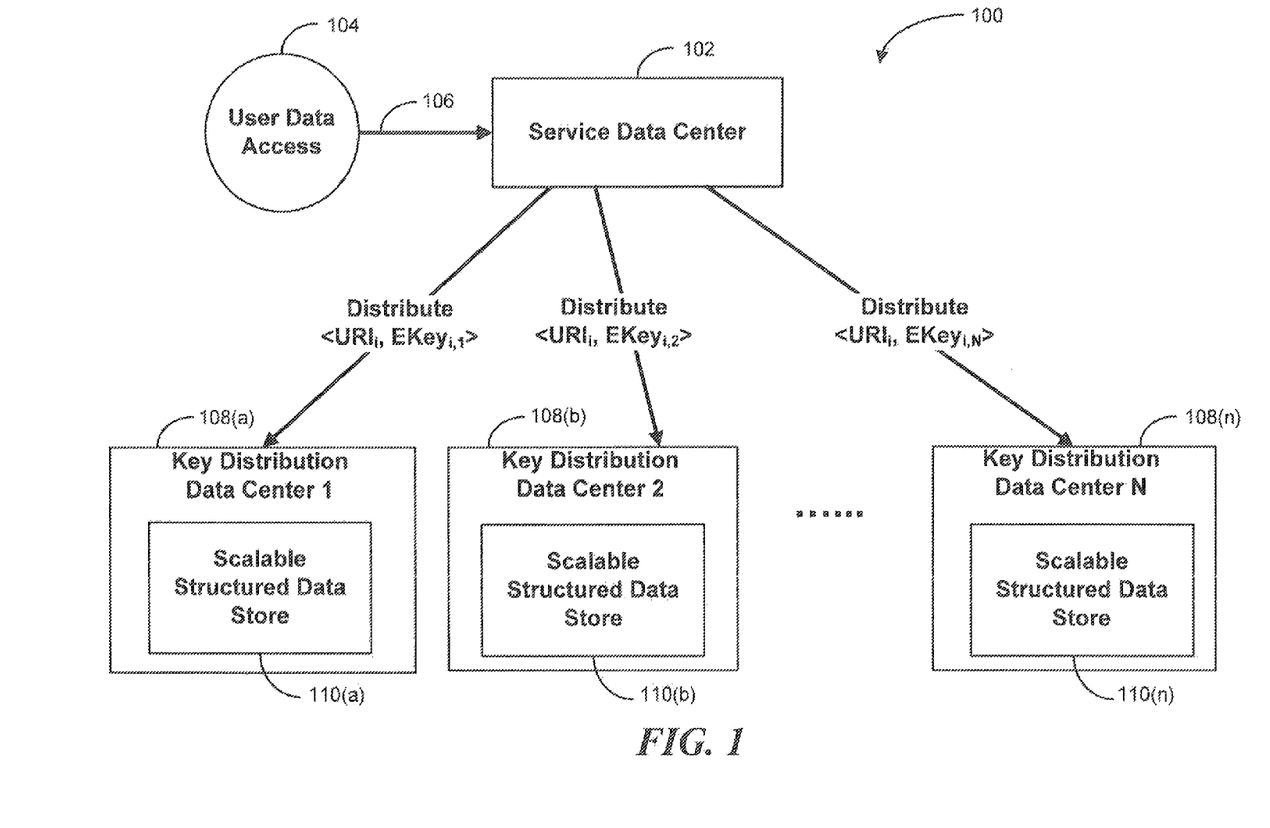
FIGS. 1-4 are block diagrams of examples of data management systems.

FIG. 1 is a block diagram of an example of a data management system 100. As illustrated in FIG. 1, the data management system 100 includes a service data center 102 that is configured to provide a service that involves an element of data management (e.g., management and storage of personal information, such as, for example, medical data and/or credit card numbers) to other electronic devices 104 (e.g., personal computers, including desktop, laptop, tablet, and netbook computers, Smartphones, and personal digital assistants (PDAs), special-purpose computers, servers, and/or mainframe computers) over a network connection 106 (e.g., a local area network (LAN) and/or a wide area network (WAN), including the Internet). In addition, the data management system 100 includes multiple different key distribution data centers $108(a)$-$108(n)$ that are accessible to the service data center over a network connection.

Each data center 102 and $108(a)$-$108(n)$ may be implemented as one or more computing devices (e.g., personal computers, general purpose computers, servers, mainframe computers, and/or combinations thereof). Each of these computing devices may have internal or external storage components storing data and programs such as an operating system and one or more application programs. The one or more application programs may be implemented as instructions that are stored in the storage components and that, when executed, cause the one or more computing devices to provide the functionality described herein. In addition, each computing device may include one or more processors for executing instructions stored in storage and/or received from one or more other electronic devices. Each computing device also typically includes one or more network interfaces and communication devices for sending and receiving data. Moreover, each data center 102 and $108(a)$-$108(n)$ may occupy one or more dedicated rooms and/or a dedicated building, and each data center 102 and $108(a)$-$108(n)$ may be physically separated from each other data center 102 and $108(a)$-$108(n)$, in some cases by large distances (e.g., thousands of miles).

In connection with providing the service involving the element of data management, the service data center 102 is configured to receive and, in some cases, store data objects from the other electronic devices 104. Before data objects received from the other electronic devices 104 are stored, the service data center 102 may determine to encrypt the received data objects.

For each data object that the service data center 102 determines to encrypt, the service data center 102 may use a corresponding unique encryption key to encrypt the data object. After a data object has been encrypted, the service data center 102 may remove the unencrypted form of the data object from the service data center 102 (e.g., the service data center 102 may delete or otherwise erase the unencrypted form of the data object) and store the encrypted form of the data object locally or at a remote data center or other type of computer memory storage system (not shown). In some implementations, the encrypted form of the data object may be outsourced to a third-party data center or other form of computer memory storage system for storage. In any case, the encrypted form of the data object may be stored at a computer memory storage system that is not under direct control of the data management system 100, is publicly accessible, or is otherwise insecure.

Each data object managed by the service provided by the service data center 102 may be addressed by a unique Uniform Resource Identifier (URI) or other identifier. Moreover, as discussed above, each encrypted data object may be associated with a unique encryption key over its lifetime. As such, the encryption key for a particular data object may be represented according to a name-value format with the name being the URI or other identifier associated with the data object and the value being the encryption key, EKey, for example denoted as {URI, EKey}.

Instead of implementing an encryption key store using a single data center, the encryption key store may be implemented across the multiple different key distribution data centers 108(a)-108(n), with an individual encryption key, $EKey_i$, being partitioned into multiple key fragments, $EKey_{i,1}$, $EKey_{i,2}$ ... $EKey_{i,N}$, each of which is distributed to one of the key distribution data centers 108(a)-108(n) for storage. For instance, in some implementations, the individual key fragments distributed to the different key distribution data centers 108(a)-108(n) may be stored in scalable structured data stores at the different key distribution data centers 108(a)-108(n). Examples of such scalable structured data stores include distributed hash tables and Google's Big Table. Of course, other data structures also may be employed at the key distribution data centers 108(a)-108(n) to store the distributed encryption key fragments.

As illustrated in FIG. 1, there may be a number of key distribution data centers 108(a)-108(n), N, and each encryption key may be partitioned into N encryption key fragments such that there is a 1:1 ratio between key distribution data centers 108(a)-108(n) and encryption key fragments for a particular encryption key and such that each key distribution data center 108(a)-108(n) stores a unique one of the N encryption key fragments. Alternatively, in other implementations, individual key distribution data centers 108(a)-108(n) may store more than one encryption key fragment, while, in still other implementations, there may be more key distribution centers 108(a)-108(n) than there are encryption key fragments such that not all key distribution data centers 108(a)-108(n) store an encryption key fragment.

Different techniques may be employed to partition an encryption key into fragments. For example, in some implementations, the service data center 102 may use a secret sharing algorithm to partition encryption keys into encryption key fragments. Alternatively, in other implementations, the service data center 102 may use an erasure coding algorithm to partition encryption keys into encryption key fragments. In either case, if a secret sharing scheme or an erasure coding scheme is used to partition the encryption key into fragments, the encryption key may be reconstructed from less than all of its encryption key fragments. That is to say, both secret sharing and erasure coding encryption key fragmentation schemes may enable an encryption key that has been partitioned into N different fragments to be reconstructed from some number, K, of the encryption key fragments that is less than N.

In some implementations, once an encryption key has been partitioned into fragments that have been distributed across the multiple key distribution data centers 108(a)-108(n), an access control mechanism may be employed to restrict access to the distributed encryption key fragments to the service data center 102 (or some other trusted delegate of the service data center). In such implementations, there may be no need to use a master encryption key to protect the distributed encryption key fragments, because only the service data center 102 (or some other trusted delegate of the service data center) is authorized to retrieve the encryption key fragments from the key distribution data centers 108(a)-108(n). In fact, in some implementations, the access control mechanism employed may make it such that only the service data center 102 even is able to determine which encryption key fragments correspond to particular encryption keys, thereby reducing the risk of renegade key distribution centers 108(a)-108(n) colluding to identify a sufficient number of encryption key fragments to reconstruct an encryption key.

Furthermore, partitioning the encryption key into fragments and distributing the fragments across multiple different key distribution data centers 108(a)-108(n) for storage provides additional security against a malicious intruder or colluding key distribution data centers by requiring the malicious intruder or colluding key distribution data centers to obtain access to a considerable number of encryption key fragments before the malicious intruder or colluding key distribution data centers will be able to reconstruct an encryption key. At the same time, however, using a scheme such as secret sharing or erasure coding to partition the encryption key such that the encryption key can be reconstructed from less than all of its encryption fragments provides a reasonably high level of availability for the encryption key fragment, because, even if certain key distribution data centers fail or are otherwise unavailable, the encryption key still may be reconstructed so long as a sufficient number of the encryption key fragments remain accessible.

Figure 2:
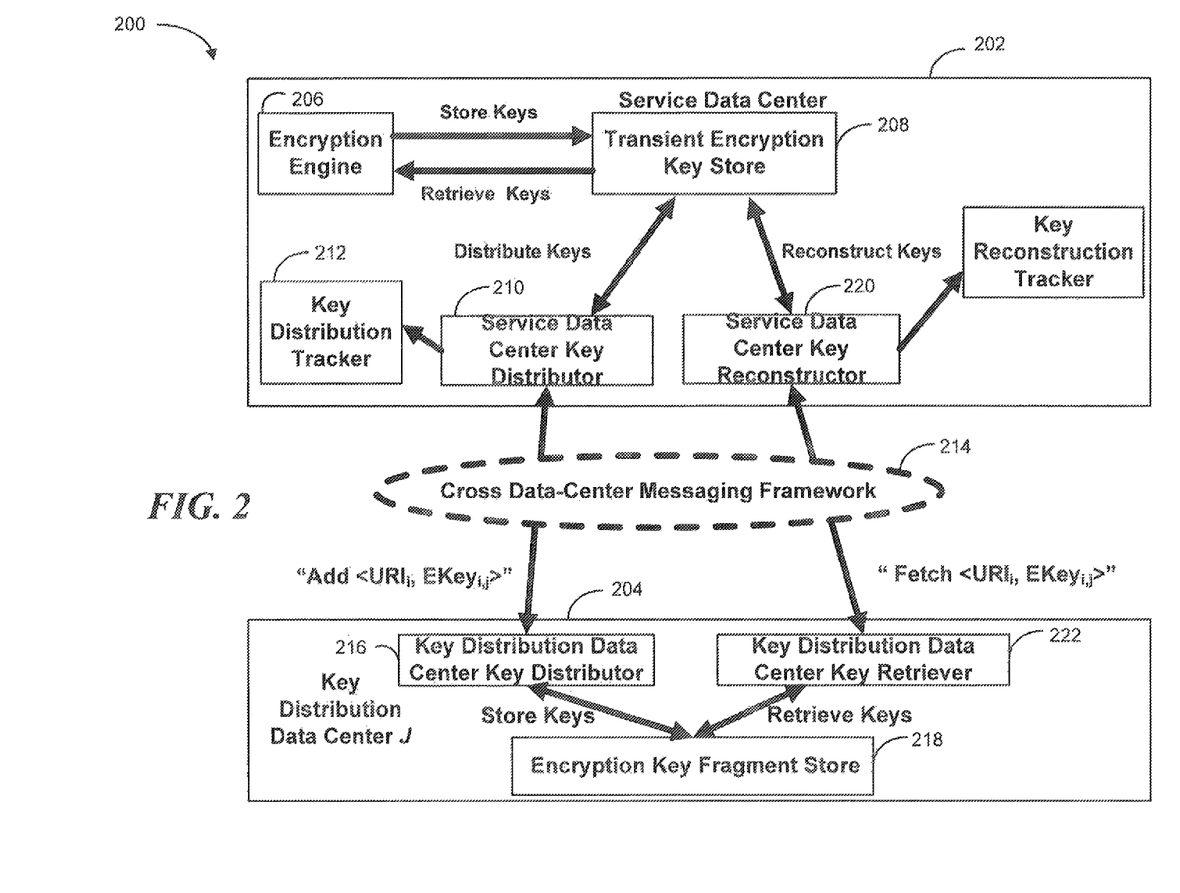

FIG. 2 is a block diagram of an example of a data management system 200 that illustrates examples of data flows between different components of the data management system 200.

As illustrated in FIG. 2, the data management system 200 includes a service data center 202 and a key distribution data center 204. For clarity and ease of illustration of the example data flows, only a single key distribution data center 204 is shown in FIG. 2. However, it will be appreciated that the data management system 200 includes multiple key distribution data centers, for example, like the data management system 100 illustrated in FIG. 1.

Among other features, the service data center 202 is configured to receive user data objects for storage from other electronic communication devices (not shown). Before storing some of the user data objects it receives, the service data center 202 encrypts them. Specifically, the service data center 202 includes an encryption engine 206 that is configured to encrypt data objects. When the service data center 202 determines to encrypt a data object, the encryption engine 206 takes the data object as an input and applies a unique encryption key, $EKey_i$, to the input data object to generate an encrypted form of the input data object.

After the encryption engine 206 has encrypted the data object, the encryption key, $EKey_i$, that was used to encrypt the data object is stored, at least for the moment, in a transient encryption key store 208 within the service data center 202. In addition, for tracking purposes, an association may be established between the encryption key, $EKey_i$, and an identifier (e.g., a URI) assigned to the data object that was encrypted using the encryption key, $EKey_i$. Later, when it is desired to decrypt the encrypted data object, this association between the identifier assigned to the data object and the encryption key, $EKey_i$, may be used to identify the encryption key, $EKey_i$, as the encryption key to be used to decrypt the encrypted data object.

A service data center key distributor 210 at the service data center 202 accesses the encryption key, $EKey_i$, from the transient encryption key store 208 and partitions the encryption key, $EKey_i$, into multiple encryption key fragments. As discussed above, the service data center key distributor 210 may use a secret sharing or an erasure coding algorithm to partition the encryption key, $EKey_i$, into the fragments. As such, the encryption key, $EKey_i$, may be partitioned into a number of encryption key fragments, N, and yet be capable of reconstruction from some number, K, of encryption key fragments that is less than all of the N encryption key fragments.

After partitioning the encryption key, $EKey_i$, into fragments, the service data center key distributor 210 transmits requests to multiple different data centers to store individual encryption key fragments. In addition to the encryption key fragments themselves, these storage requests also may include the identifier assigned to the encrypted data object (or some representation of the identifier assigned to the encrypted data object). For example, as illustrated in FIG. 2, the service data center key distributor 210 transmits a request to the j-th key distribution data center 204 to store the j-th encryption key fragment, $EKey_{i,j}$ (e.g., Add $\{URI_i, EKey_{i,j}\}$).

Additionally or alternatively, the storage requests may bear a hallmark of the service data center 202. As will be described in greater detail below, this service data center hallmark may serve as an access control mechanism, with the key distribution data centers restricting retrieval of the encryption key fragments to only the service data center 202 (or some trusted delegate of the service data center). In one example, the service data center 202 may sign the encryption key fragment storage requests that it issues with its private signing key. Such requests signed with the private signing key of the service data center 202 may be considered to bear a hallmark of the service data center 202 because the private signing key is a secret known only to the service data center 202. Moreover, when the service data center 202 issues an encryption key fragment storage request that is signed with its private signing key, the key distribution data centers may be configured to restrict subsequent access to the encryption key fragment to requests that are signed with the same signing key. In a second example, the service data center 202 may incorporate one or more other secret values known only to the service data center 202 in encryption key fragment requests that it issues. Here again, these requests may be considered to bear a hallmark of the service data center 202 because the one or more secret values incorporated within the storage requests are known only to the service data center 202. Furthermore, when the service data center 202 issues an encryption key fragment storage request within which one or more secret values known only to the service data center 202 are incorporated, the key distribution data centers may be configured to restrict subsequent access to the encryption key fragment to requests within which the same one or more secret values are incorporated.

In some implementations, the service data center key distributor 210 may distribute only a single encryption key fragment to each key distribution data center. In some alternative implementations, the service data center key distributor 210 may distribute more than one encryption key fragment to one or more of the key distribution data centers.

As part of transmitting the encryption key fragment storage requests to the different key distribution data centers, the service data center key distributor 210 may log each request in a key distribution tracker 212 maintained by the service data center 202.

A network 214 may provide direct or indirect communication links between the service data center 202 and each of the key distribution data centers. Examples of this network 214 include the Internet, the World Wide Web, wide area networks (WANs), local area networks (LANs), analog or digital wired and wireless telephone networks, radio, television, cable, satellite, and/or any other delivery mechanisms for carrying data. A message exchange framework may be implemented over this network 214 in order to enable the exchange of messages between the service data center 202 and the key distribution data centers. In some implementations, this message exchange framework may be implemented via a scalable message queue mechanism. Examples of such scalable message queue mechanisms that may be used to implement the message exchange framework include RabbitMQ or ActiveMQ from Apache. In some implementations, this message exchange framework may be implemented via a remote procedure call (RPC) mechanism or a web service invocation mechanism.

Each key distribution data center may include a key distribution data center distributor that is configured to receive encryption key fragments from the service data center 202 and an encryption key fragment store that is configured to store received encryption key fragments. For example, as illustrated in FIG. 2, the key distribution data center key distributor 216 at the j-th key distribution data center 204 receives the j-th encryption key fragment storage request to store the j-th encryption key fragment, $EKey_{i,j}$, transmitted by the service data center 202 and stores the j-th encryption key fragment, $EKey_{i,j}$, to the key distribution data center's encryption key fragment store 218 along with an indication of the association between the encryption key fragment, $EKey_{i,j}$, and the identifier assigned to the data object. In addition, the key distribution data center 204 also may send an acknowledgement (e.g., Add $\{URI_i, EKey_{i,j}\}$ OK,) to the service data center 202 to signal that the encryption key fragment, $EKey_{i,j}$, has been stored successfully.

Upon receiving positive acknowledgement from the j-th key distribution data center 204 that the encryption key fragment, $EKey_{i,j}$, has been stored successfully, the service data center key distributor 210 updates the key distribution tracker 212 log to reflect that the encryption key fragment, $EKey_{i,j}$, was stored successfully. Using the key distribution tracker 212 log, the service data center key distributor 210 can monitor the status of the storage requests sent to each of the key distribution data centers.

Due to key distribution data center or network 214 failure, encryption key fragment storage requests transmitted by the service data center 202 to one or more of the key distribution data centers may not be received or acted upon successfully by one or more of the key distribution data centers in the first instance. Therefore, the service data center key distributor 210 intermittently (e.g., periodically) may assess the status of confirmation messages received from the key distribution data centers to which storage requests were sent and resend storage requests to each of the key distribution data centers from which a confirmation message has not yet been received.

Once the service data center 202 has received confirmations from a sufficient number of the key distribution data centers to which encryption key fragment storage requests were sent, the service data center key distributor 210 may declare the distribution of the encryption key fragments a success, which, in turn, may trigger the service data center 202 to remove (e.g., delete or otherwise erase) the encryption key, $EKey_i$, from the transient encryption key store 208 at the service data center 202. In some implementations, the service data center key distributor 210 may wait until confirmations have been received from all of the key distribution data centers to which key fragment storage requests were sent before declaring the distribution a success. In other implementations, the service data center key distributor 210 may determine that a sufficient number of the key distribution data centers have confirmed successful storage of the encryption key fragments and declare the distribution a success before the service data center key distributor 210 has received confirmations from all of the key distribution data centers to which key fragment storage requests were sent. For example, the service data center key distributor may calculate a threshold number of confirmations needed to be received in order to declare a distribution a success by balancing the tradeoff between key distribution performance (e.g., the time required to complete the distribution of the encryption key fragments to different key distribution data centers) and reliability, understanding that the more encryption key fragments that are stored successfully before declaring the distribution a success, the more likely it is that the encryption key will be able to be reconstructed. In some implementations, the service data center key distributor 210 may calculate the threshold number on the fly at the time of the distribution, whereas, in other implementations, the service data center key distributor 210 may calculate the threshold number in advance.

After successful distribution of the encryption key fragments, the service data center 202 may store the encrypted data object and remove (e.g., delete or otherwise erase) the unencrypted data object from the service data center 202. In some implementations, the service data center 202 may store the encrypted data object locally. Additionally or alternatively, the service data center 202 may transmit the encrypted data object to a remote data center (not shown) for storage. In some cases, the remote data center may be owned and/or operated by a third-party. However, even in such cases, the data object remains secure because it is encrypted.

In some implementations, for groups of data objects that the service data center 202 encrypts within a short period of time, the service data center key distributor 210 may bundle corresponding encryption key fragment storage requests together for transmission to individual key distribution data centers as a single message in order to improve data communication efficiency. Correspondingly, the individual key distribution data centers also may bundle multiple acknowledgement messages together for encryption key fragments that they store within a short period of time of one another.

In addition to managing the storage of encrypted data objects and their associated encryption keys, the data management system 200 also manages the retrieval of encryption keys and the decryption of data objects using such retrieved encryption keys. When a need arises for an encrypted data object to be decrypted, the service data center 202 identifies the identifier (e.g., URI) for the data object and the service data center key reconstructor 220 issues a request to each of the key data distribution centers to retrieve encryption key fragments associated with the identifier for the data object. For example, as illustrated in FIG. 2, when a need arises to decrypt the i-th data object, the service data center key reconstructor 220 may issue an encryption key fragment retrieval message (e.g., retrieve key of $URI_i$) to all key distribution data centers that store encryption key fragments.

As described briefly above and as will be described in greater detail below, in some implementations, encryption key fragment storage requests issued by the service data center 202 bear hallmarks of the service data center 202 that function as access controls by asserting ownership of the encryption key fragments by the service data center 202. In such implementations, the key distribution data centers may be configured to limit retrieval of encryption key fragments that were received in connection with storage requests bearing such hallmarks of the service data center 202 only to entities that can prove ownership of the encryption key fragments (e.g., the service data center 202 or some trusted delegate of the service data center 202). Therefore, in these implementations, the encryption key fragment retrieval requests issued by the service data center 202 also may bear hallmarks of the service data center 202. As such, when a key distribution data center receives an encryption key fragment retrieval request from the service data center 202, the key distribution data center may validate that the hallmark borne by the retrieval request demonstrates ownership of the encryption key fragment before allowing the service data center 202 to retrieve the encryption key fragment. In contrast, if an encryption key fragment request is received from a malicious intruder who is unable to demonstrate ownership of the encryption key fragment, the key distribution data center is configured to deny the encryption key fragment retrieval request.

The key distribution data centers include key distribution data center retrievers that are configured to receive and act upon encryption key retrieval requests received from the service data center. For example, the j-th key distribution data center 204 includes key distribution data center retriever 222. When the key distribution data center retrievers receive a retrieval request, they identify any encryption key fragments stored in their encryption key fragment stores that are associated with the identifier for the relevant data object and return the identified encryption key fragments to the service data center 202.

After the key distribution data centers return a sufficient number of encryption key fragments associated with the data object, the service data center reconstructor 220 reconstructs the encryption key for the data object from the returned encryption key fragments. The reconstructed encryption key then is transferred to the transient encryption key store 208 from which it is accessed by the encryption engine 206 in the data management system 200 to decrypt the data object.

The data management system 200 also manages the expiration of encrypted data objects when they reach the end of their lifetimes. In some implementations, the data management system 200 expires an encrypted data object that has reached the end of its lifetime by removing (e.g., deleting or otherwise erasing) its encryption key rather than actually acting upon the data object itself. This is possible because the encrypted data object cannot be decrypted without its encryption key, so removing the encryption key effectively expires the encrypted data object. Moreover, expiring the encrypted data object in this fashion may be useful in implementations in which the encrypted data object itself has been outsourced for storage to a third party and, thus, is not directly accessible to the data management system 200.

There are at least two conditions that may trigger the expiration of a data object. First, the data object may be assigned a lifetime having a certain time period, and, when this time period elapses, the data object may be expired. Second, a user or application may make an explicit request for the data object to be expired.

Each service data center 202 may be equipped with a policy enforcement controller. When the policy enforcement controller detects that a data object's retention time has expired, the service data center 202 may issue a key deletion message (e.g., "Delete Key for $URI_i$") to all the key distribution data centers. Thereafter, the policy enforcement controller may monitor responses received from the various key distribution data centers, keeping track of whether positive acknowledgements (e.g., "Delete {URIi, $EKey_{i,j}$} OK") are returned from each of the key distribution data centers to make sure that enough of the encryption key fragment deletion requests are faithfully carried out by each of the key distribution data centers so that the encryption key cannot be reconstructed. If a period of time elapses and acknowledgement messages have not been received from each of the key distribution data centers, the policy enforcement controller may resend deletion messages to those key distribution data centers that have not yet confirmed successful deletion. As will be understood, a similar protocol may be followed in order to delete appropriate encryption key fragments when an explicit request to expire a particular data object is received from a user or other application.

As discussed above, a data management system may be configured such that encryption key fragment retrieval or removal is allowed only when the service data center making the operation request demonstrates authorization to make the request. In some implementations, the ownership of an encryption key may be tracked and used as a mechanism for controlling access to the encryption key. In such implementations, requests to store encryption key fragments issued by service data centers may bear hallmarks of the service data centers that assert ownership over the encryption key fragments by the corresponding service data centers making the storage requests, and the key distribution data centers may be configured to restrict access to the encryption key fragments to their owners.

Figure 3:
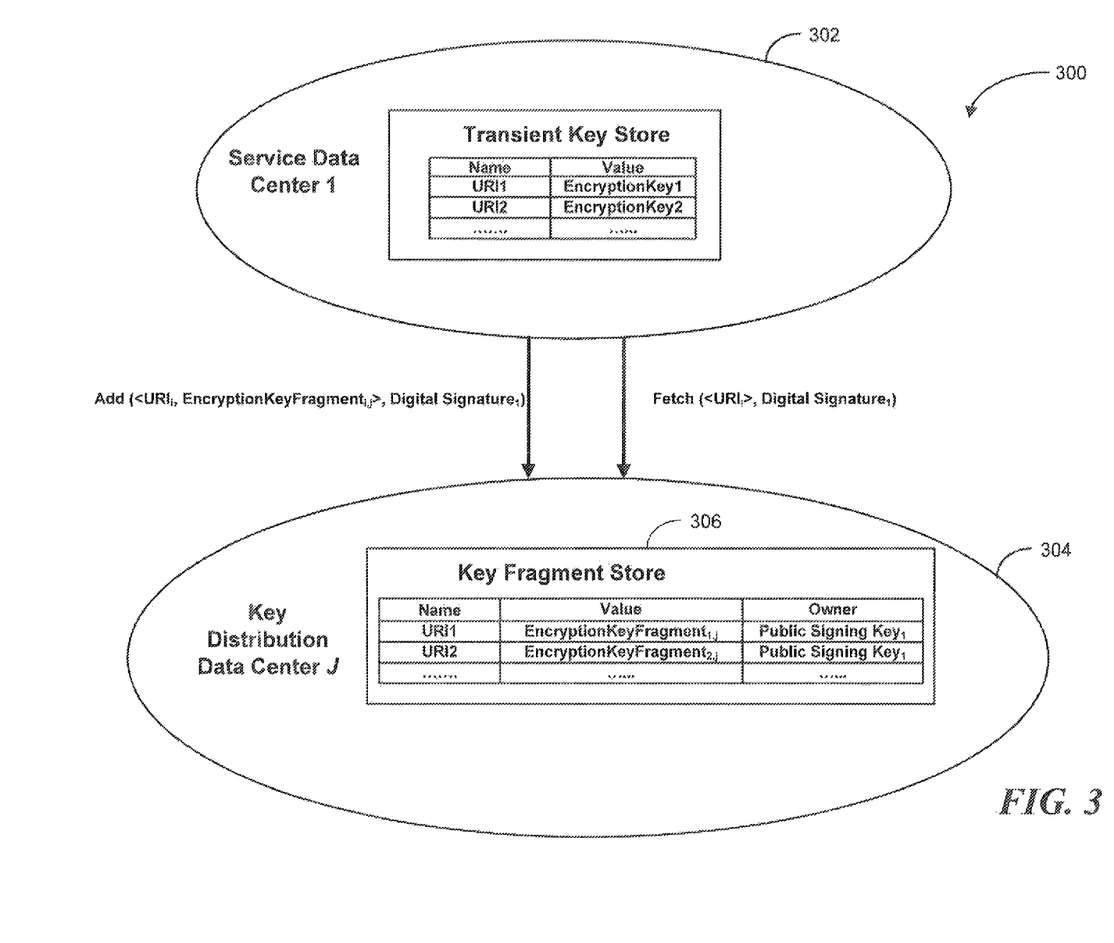

Referring to FIG. 3, in one example data management system 300, ownership of encryption key fragments may be represented by a public key of the service data center 302 that created the encryption key from which the encryption key fragments were derived and that distributed the resulting encryption key fragments to the key distribution data centers 304. As illustrated in FIG. 3, in such implementations, when the service data center 302 issues a request to store an encryption key fragment, the service data center 302 may sign the request using the service data center's private signing key. This digital signature of the request using the service data center's private key may be considered a hallmark of the service data center 302. When a key distribution data center 304 receives the storage request, the key distribution data center 304 may verify that the digital signature of the storage request corresponds to an approved service data center, for example, using the approved service data center's public signing key, which is known by the key distribution data center 304, before storing the encryption key fragment. Additionally, as part of storing the encryption key fragment, the key distribution data center 304 also may store the public signing key of the service data center 302 (or some other representation of ownership by the service data center 302) in a manner that reflects the ownership relationship. For instance, the key distribution data center 304 may store the encryption key fragment in a table 306 with the public signing key of the service data center 302 being stored in the same row within the table 306 as the encryption key fragment.

Like a request to store an encryption key fragment, when the service data center 302 issues a request to retrieve or delete an encryption key fragment, the service data center 302 also may sign the retrieval or deletion request with the service data center's private signing key. When the key distribution data center 304 receives such a retrieval or deletion request, before acting on the request, the key distribution data center 304 may use the public signing key of the service data center 302, which is known by the key distribution data center 304 and which may be associated with the encryption key fragment (e.g., stored in the same row as the encryption key fragment), to verify that the digital signature of the retrieval or deletion request demonstrates authorization to access the encryption key fragment.

Figure 4:
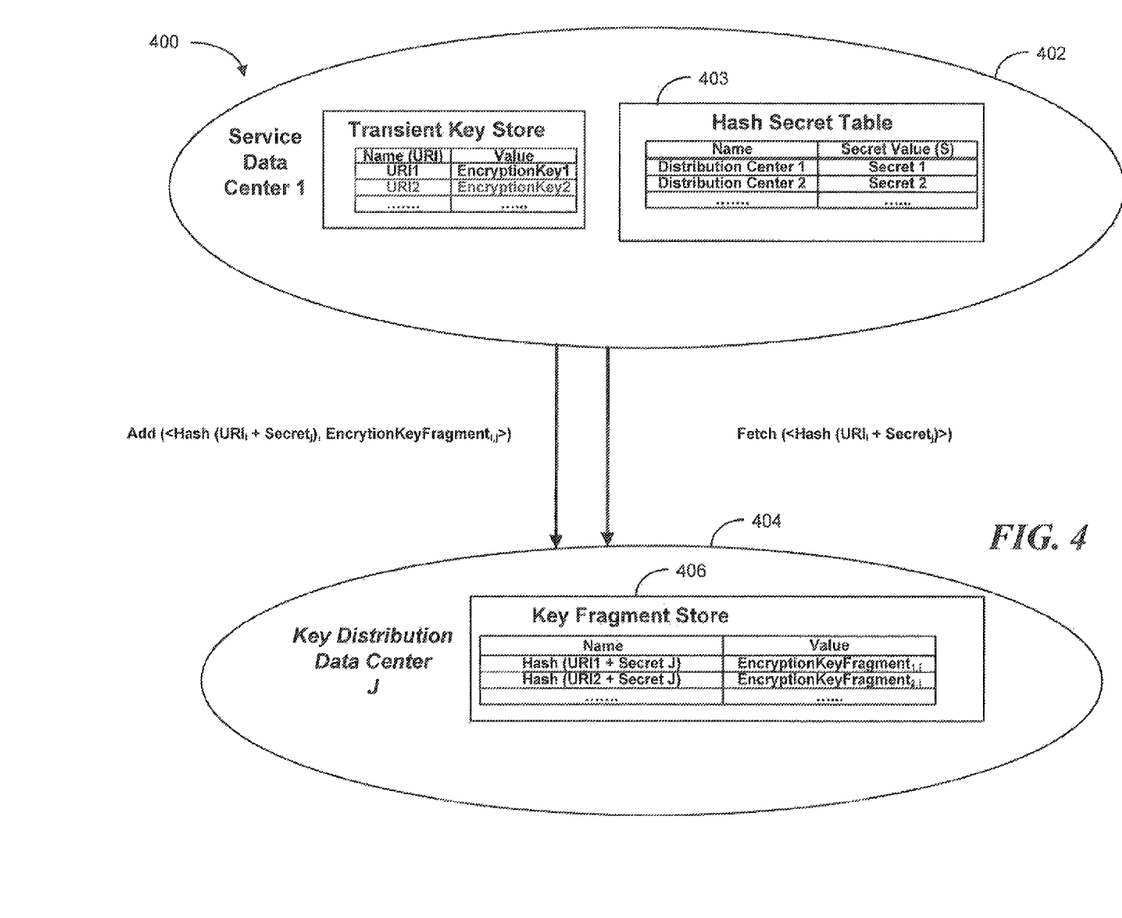

Referring to FIG. 4, in a second example of a data management system 400, ownership of encryption key fragments derived from an encryption key may be represented by a secret value known only to the service data center 402 that owns the encryption key fragment. In such implementations, use of such a secret value within a storage request issued by the service data center 402 may be considered a hallmark of the service data center 402 issuing the request that asserts ownership over the encryption key fragment by the service data center 402. As illustrated in FIG. 4, in such implementations, the service data center 402 may maintain unique and secret identifiers for each of the key distribution data centers, for example in a secret table 403. It will be appreciated that the service data center 402 may employ a variety of different techniques to ensure that the unique and secret identifiers for the key distribution data centers are stored persistently, reliably, and securely at the service data center 402.

Then, when the service data center 402 sends a request to store an encryption key fragment to a particular one of the key distribution data centers 404, j, the service data center 402 may apply a hash function to the combination of the identifier (e.g., $URI_i$) associated with the data object encrypted using the encryption key and the secret, unique identifier for the particular key distribution data center 404, j, represented as Hash ($URI_i$+$Secret_j$). One example of a one-way hash function that may be used to generate the hash of the identifier (e.g., URI) for the data object may be SHA-256.

As further illustrated in FIG. 4, in such implementations, when the key distribution data center 404, j, receives an encryption key fragment storage request including the hash result of the identifier of a data object, i, and the secret, unique value for the key distribution data center 404, j, the key distribution data center 404 may store both the encryption key fragment and the unique hash result of the combination of the data object identifier and the secret, unique value for the key distribution data center 404 in a manner that reflects the relationship between the two, for example in name-value format as {Hash ($URI_i$+$Secret_j$), $Ekey_{i,j}$}. In this manner, the hash result of the combination of the data object identifier and the secret, unique value for the key distribution data center 404 serves as the name for the encryption key fragment within the encryption key fragment store 406 at the key distribution data center 404.

Incorporating the secret, unique identifiers for the key distribution data centers into the value to which the hash function is applied serves as a barrier against collusion by the key distribution data centers by producing hashes of the identifier (e.g., URI) for the data object that are unique for each key distribution data center. As a result, it may be impractical for colluding key distribution data centers to determine which encryption key fragments belong to the same data object, because the hash result of the data object identifier is different at each key distribution data center. However, because the service data center 402 that owns the encryption key fragment knows both the data object identifier (e.g., URI), and the secret, unique values for each of the key distribution centers, the service data center 402 is able to construct correct replicas of the hashed data object identifiers, and, therefore, the service data center is able to demonstrate ownership of the encryption key fragments.

For example, when the service data center 402 desires to retrieve or delete the encryption key fragment corresponding to the data object, i, from the key distribution data center 404, j, the service data center 402 may request that the key distribution data center 404, j, retrieve or delete the encryption key fragment corresponding to the hash result of the identifier of the data object (e.g., $URI_i$) and the secret, unique value for the key distribution data center 404, j. In response, the key distribution data center 404 may retrieve or delete the corresponding encryption key fragment from the encryption key fragment store 406. Because only the service data center 402 knows the secret, unique value for the key distribution data center 404, j, only the service data center 402 is able to re-create the hash result of the identifier of the data object (i.e., $URI_i$) and the secret, unique value for the key distribution data center 404, j. Thus, only the service data center 402 is able to retrieve or delete the encryption key fragment from the encryption key fragment store 406 because only the service data center is able to re-create the name for the encryption key fragment from the encryption key fragment store 406.

In addition or as an alternative to maintaining secret, unique values for each of the key distribution data centers, in some implementations, the service data center may maintain the identifiers for data objects (e.g., URIs) as unguessable secret values. In such implementations, the service data center again will be the only entity able to re-create the hash results of the identifiers for the data objects and the values for the key distribution data centers, again making collusion between key distribution data centers impractical.

In some implementations, a service data center and key distribution data centers may be placed in the same geographical zone so that the service data center is close to the key distribution data centers, which may result in relatively low communication latency. Alternatively, the key distribution data centers may be placed in different geographical regions from one another and/or the service data center, which may provide enhanced resiliency to natural disasters.

When distributing encryption key fragments to key distribution data centers, a service data center may distribute a sufficient number of encryption key fragments from which to reconstruct an encryption key to key distribution data centers that are in the same geographical zone as the service data center in an effort to reduce latency. Additionally or alternatively, a service data center also may distribute a sufficient number of encryption key fragments to key distribution data centers that are in different geographical zones in an effort to improve the chances of maintaining availability in the face of a natural disaster or some other catastrophic event in one of the geographical zones.

In some implementations, a session-based key reconstruction mechanism may be employed to reconstruct encryption keys for related data objects. In particular, a data management system may maintain one or more application-specific index tables that identify related data objects (e.g., data objects related to a specific user) such that when a user application session is established with the data management service, the data management system is able to access the index table specific to the application and identify data objects that may be related to one another and that potentially may be accessed during the user application session. Additionally or alternatively, after a specific data object has been accessed, the index tables may enable the data management system to identify other data objects that may be related to the specific data object and that are likely to be accessed in the near future. Once such a target data object set has been identified, the service data center key reconstructor may issue bulk requests for all the encryption keys fragments belonging to the data objects in the target data object set. Correspondingly, in response to such bulk requests, individual key distribution data centers may return bulk retrieval messages with the encryption key fragments belonging to all of the data objects in the target data object set. The service data center key reconstructor then can reconstruct the encryption keys for the data objects in the target data object set based on the returned bulk messages and populate the reconstructed keys to the transient encryption key store, from which they may be accessed when desired.

Figure 5:
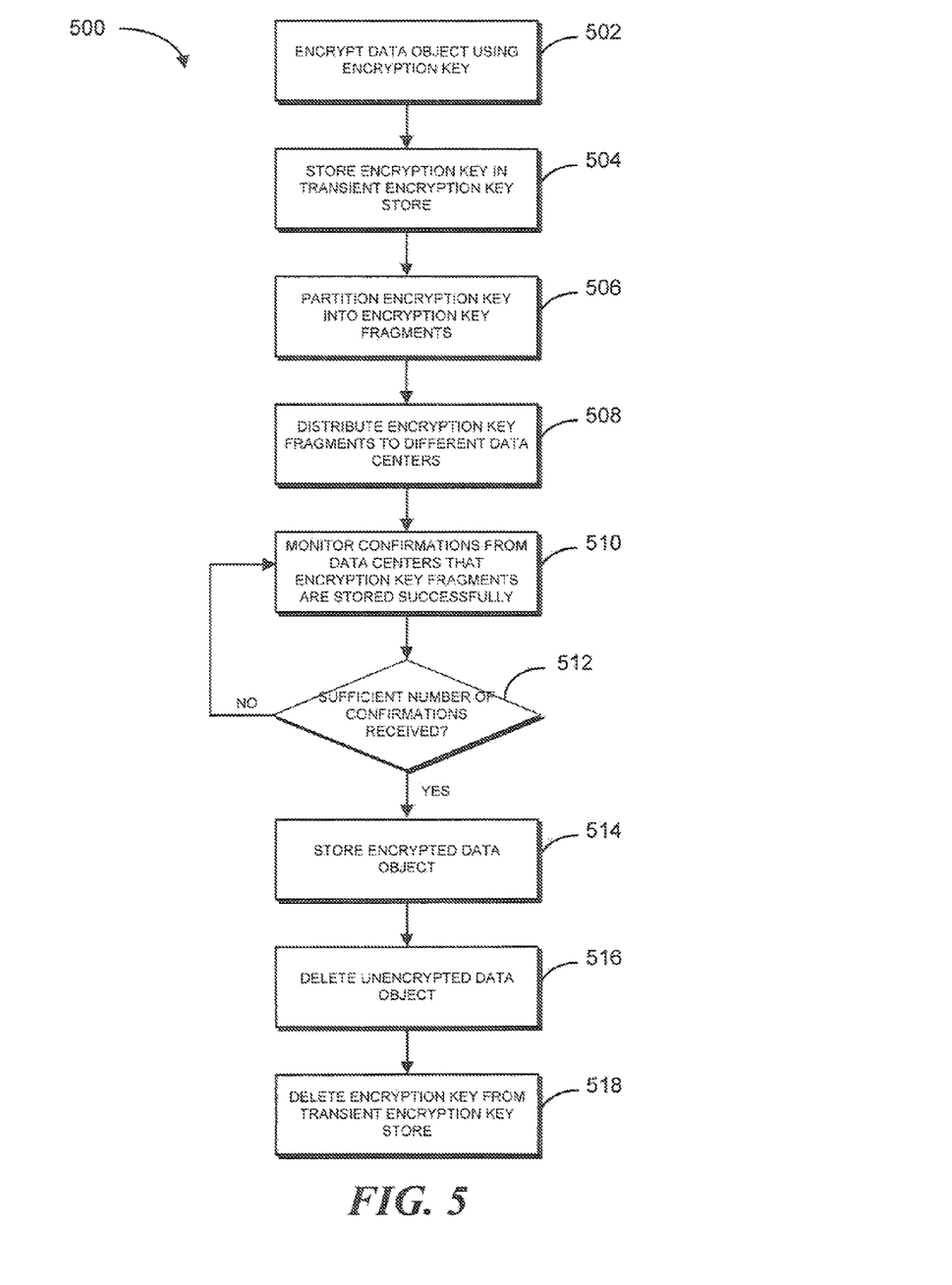
FIG. 5 is a flowchart of an example of a process for managing an encryption key.

FIG. 5 is a flowchart 500 of an example of a process for managing an encryption key. The process illustrated in the flowchart 500 may be performed by a service data center such as one of the service data centers 102, 202, 302, and 402 illustrated in FIGS. 1-4. More specifically, the process illustrated in the flowchart 500 of FIG. 5 may be performed by one or more processing elements of the computing device(s) that implement such data centers as a consequence of executing instructions stored on computer-readable storage media accessible to the data center.

The process begins when the service data center encrypts a data object using an encryption key (502). The service data center stores the encryption key in a transient encryption key store at the service data center (504) and partitions the encryption key into a number of encryption key fragments (506). For example, the service data center may employ a secret sharing or erasure coding scheme to partition the encryption key into a number of encryption key fragments such that the encryption key may be reconstructed from less than all of the encryption key fragments.

After partitioning the encryption key into fragments, the service data center distributes the fragments of the encryption key to multiple different data centers for storage (508). In some implementations, the service data center may distribute only a single encryption key fragment to each other data center. In alternative implementations, the service data center may distribute more than one encryption key fragment to some or all of the other data centers.

Distributing the fragments of the encryption key in this fashion adds a layer of security to the encryption key that makes it more difficult for the data centers to collude to reconstruct the encryption key from the fragments that they store. For example, assuming that the encryption key was partitioned into n fragments, that the encryption key can be reconstructed from some number k less than n of the fragments of the encryption key, and that the service data center distributed each of the n fragments of the encryption key to a different data center, at least k of the data centers would need to collude in order to be able to reconstruct the encryption key.

In some implementations, the data object that was encrypted using the encryption key may be addressed or otherwise identified by a unique identifier (e.g., a URI). In such implementations, the service data center may transmit an indication of this unique identifier (e.g., URI) for the data object along with each of the fragments of the encryption key. For example, the service data center may distribute the unique identifier for the data object and the individual encryption key fragments as name-value pairs to the different data centers. Then, when the service data center later wishes to retrieve and/or delete the individual encryption key fragments stored by the other data centers, the service data center simply may request that the other data centers retrieve and/or delete the encryption key fragments corresponding to the unique identifier for the data object.

To provide additional security for the encryption key, in some implementations, the service data center may use a private signing key to digitally sign the encryption key fragment storage requests that the service data center sends to the other data centers. The other data centers, knowing the public key for the service data center, then may verify the identity of the service data center that sent the encryption key fragment storage request and interpret the digital signature of the service data center as an assertion of ownership over the encryption key fragments. Consequently, the other data centers may restrict future access to the encryption key fragments to the service data center that distributed the encryption key fragments (or some trusted delegate) by only granting access requests that similarly are signed with the private signing key of the service data center.

Furthermore, to protect against collusion by the other data centers, in some implementations, the service data center may generate hash results of the unique identifier (e.g., URI) for the data object that are unique for each data center and send these unique hash results to the other data centers instead of the unique identifier (e.g., URI) for the data object itself. For example, by applying a hashing function to the combination of the unique identifier (e.g., URI) for the data object and unique values for each of the other data centers that are known only to the service data center, the service data center can generate unique hash results of the identifier (e.g., URI) for the data object for each of the other data centers. The service data center then may transmit the unique hash results of the identifier (e.g., URI) of the data object and the fragments of the encryption key to the other data centers as name-value pairs.

Then, when the service data center later wishes to retrieve and/or delete the individual encryption key fragments stored by the other data centers, the service data center may re-compute the unique hash results of the identifier (e.g., URI) for the data object for each of the other data centers and include these re-computed hash results when sending retrieval and/or deletion requests to the other data centers. Because only the service data center knows these unique hash results for the different data centers, this scheme may make collusion among the different data centers to reconstruct encryption keys from the encryption key fragments impractical.

Encryption key fragment storage requests that are digitally signed using the private signing key of the service data center and encryption key fragment requests that include hash results of the identifier (e.g., URI) for the data object that are unique for each data center both may be said to bear hallmarks of the service data center as both bear indicia of values known only to the service data center. In the case of the requests that are digitally signed using the private signing key of the service data center, the private signing key is a value known only to the service data center. Similarly, in the case of the requests that include hash results of the identifier (e.g., URI) for the data object that are unique for each data center, the unique hash results are obtained by combining the identifier (e.g., URI) for the data object with unique values for the different data centers that are known only by the service data center.

After distributing the fragments of the encryption key to the different data centers, the service data center monitors incoming acknowledgements from the service data centers that confirm that individual encryption key fragments have been stored successfully (510). Then, when the service data center determines that some sufficient number of the encryption key fragments have been stored (512), the service data center stores the encrypted form of the data object (e.g., locally or at a remote data storage facility, perhaps maintained by a third party) (514), deletes the unencrypted form of the data object (516), and deletes the encryption key from the transient encryption key store at the service data center (518).

Figure 6:
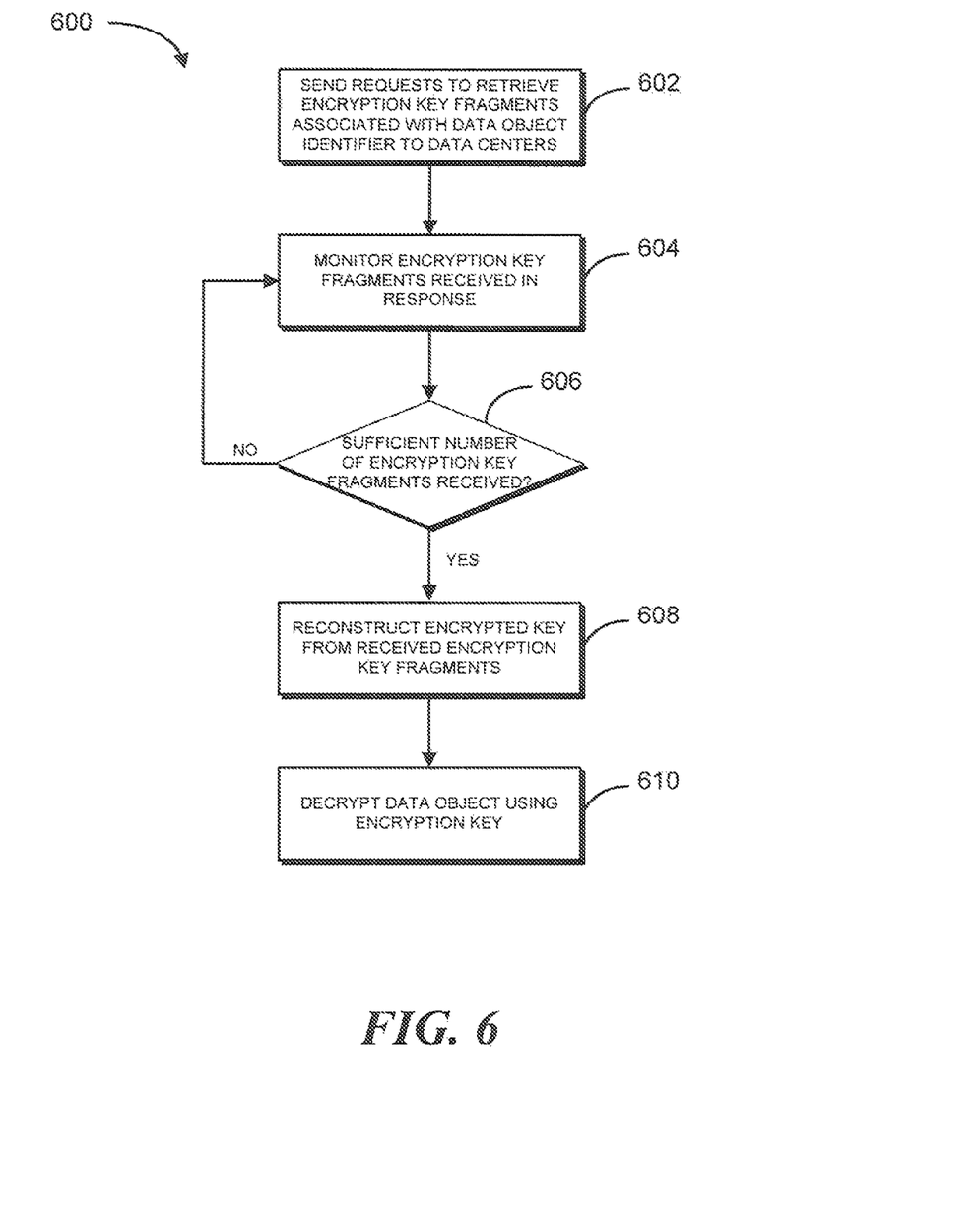
FIG. 6 is a flowchart of an example of a process for reconstructing an encryption key from distributed encryption key fragments.

FIG. 6 is a flowchart 600 of an example of a process for reconstructing an encryption key from encryption key fragments that have been distributed across a number of different data centers. The process illustrated in the flowchart 600 may be performed by a service data center such as one of the service data centers 102, 202, 302, and 402 illustrated in FIGS. 1-4. More specifically, the process illustrated in the flowchart 600 of FIG. 6 may be performed by one or more processing elements of the computing device(s) that implement such data centers as a consequence of executing instructions stored on computer-readable storage media.

The service data center sends requests to retrieve encryption key fragments associated with a particular data object to the data centers configured to store encryption key fragments (602). For example, in cases where the service data center distributed the fragments of the encryption key that the service data center now desires to reconstruct in a name-value format along with the identifier (e.g., URI) for the data object, the service data center may send requests to retrieve fragments of the encryption key that are associated with the identifier (e.g., URI) for the data object to the other data centers. Likewise, in cases where the service data center used its private signing key to digitally sign the storage requests that it issued to the other data centers to store the fragments of the encryption key that the service data center now desires to reconstruct, the service data center similarly may sign its retrieval requests with its private signing key. Furthermore, in cases where the service data center generated unique hash results of the identifier (e.g., URI) for the data object for each of the different data centers, the service data center may re-compute the unique hash results of the identifier (e.g., URI) for the data object and include the corresponding unique hash results in its retrieval requests to the individual data centers.

After sending the requests to retrieve the fragments of the encryption key to the data centers, the service data center monitors the fragments of the encryption key received from the other data centers in response (604). Then, after determining that a sufficient number of the fragments of the encryption key have been received from the other data centers to reconstruct the encryption key (606), the service data center re-creates the encryption key based on the fragments of the encryption key received from the other data centers (608). Thereafter, the service data center is able to use the reconstructed encryption key to decrypt the particular data object (610).

A number of methods, techniques, systems, and apparatuses have been described. The described methods, techniques, systems, and apparatuses may be implemented in digital electronic circuitry or computer hardware, for example, by executing instructions stored in computer-readable storage media.

Apparatuses implementing these techniques may include appropriate input and output devices, a computer processor, and/or a tangible computer-readable storage medium storing instructions for execution by a processor.

A process implementing techniques disclosed herein may be performed by a processor executing instructions stored on a tangible computer-readable storage medium for performing desired functions by operating on input data and generating appropriate output. Suitable processors include, by way of example, both general and special purpose microprocessors. Suitable computer-readable storage devices for storing executable instructions include all forms of non-volatile memory, including, by way of example, semiconductor memory devices, such as Erasable Programmable Read-Only Memory (EPROM), Electrically Erasable Programmable Read-Only Memory (EEPROM), and flash memory devices; magnetic disks such as fixed, floppy, and removable disks; other magnetic media including tape; and optical media such as Compact Discs (CDs) or Digital Video Disks (DVDs). Any of the foregoing may be supplemented by, or incorporated in, specially designed application-specific integrated circuits (ASICs).

Although the operations of the disclosed techniques may be described herein as being performed in a certain order, in some implementations, individual operations may be rearranged in a different order and/or eliminated and the desired results still may be achieved. Similarly, components in the disclosed systems may be combined in a different manner and/or replaced or supplemented by other components and the desired results still may be achieved.

What is claimed is:

1. A computer-implemented method, the method comprising:
encrypting a data object using an encryption key, the data object being associated with a data-object identifier that identifies the data object;
dividing the encryption key into a first number, n, of encryption-key fragments according to an algorithm that enables reconstruction of the encryption key from a second number, k, of the encryption-key fragments, k being less than or equal to n; and
transmitting store requests to store different ones of the encryption-key fragments to different computer memory storage systems, each of the different computer memory storage systems having a unique identifier, each request to store an encryption-key fragment comprising:
at least one of the encryption-key fragments;
a name assigned to the at least one of the encryption key fragments included in the request, the name based upon a combination of the unique identifier for the computer memory storage system that is requested to store the least one of the encryption key fragments included in the request and the data object identifier, wherein retrieval of the at least one of the encryption key fragments of the request is based upon use of the name; and
an access control hallmark for regulating access to the encryption-key fragment.

2. The method of claim 1 further comprising:
store requests, transmitting retrieve requests to retrieve the encryption-key fragments from the computer memory storage systems, each retrieve request bearing the access control hallmark;
responsive to the retrieve requests, receiving at least k of the encryption-key fragments; and
reconstructing the encryption key from the at least k received encryption-key fragments.

3. A computer-implemented method, the method comprising:
encrypting a data object using an encryption key, the data object being associated with a data-object identifier that identifies the data object;
dividing the encryption key into a first number, n, of encryption-key fragments according to an algorithm that enables reconstruction of the encryption key from a second number, k, of the encryption-key fragments, k being less than or equal to n; and
transmitting store requests to store different ones of the encryption-key fragments to different computer memory storage systems, each request to store an encryption-key fragment including,
at least one of the encryption-key fragments,
a data-center-specific data-object identifier for identifying the data object to a service center, different store requests including different respective data-center-specific data-object identifiers,
an access control hallmark for regulating access to the encryption-key fragment;
store requests, transmitting retrieve requests to retrieve the encryption-key fragments from the computer memory storage systems, each retrieve request bearing the access control hallmark;
responsive to the retrieve requests, receiving at least k of the encryption-key fragments;
reconstructing the encryption key from the at least k received encryption-key fragments; and
receiving a data-object request to access the data object, wherein the transmitting of retrieve requests further includes:
determining that the data object is related to other encrypted data objects associated with other corresponding identifiers and for which encryption-key fragments have been distributed to the computer memory storage systems; and
as a consequence of having received the data-object request and having determined that the data object is related to the other encrypted data objects and without yet having received requests to access the other encrypted data objects, transmitting retrieve requests to retrieve encryption-key fragments corresponding to the identifiers associated with the other encrypted data objects from the computer memory storage systems, each retrieve request bearing an access control hallmark that matches an access control hallmark made in a respective store request so as to demonstrate authorization to access the respective encryption-key fragment.

4. The method of claim 1 wherein dividing the encryption key into n encryption-key fragments according to an algorithm that enables reconstruction of the encryption key from k of the encryption-key fragments includes dividing the encryption key into n encryption-key fragments according to a secret sharing algorithm that enables reconstruction of the encryption key from k of the encryption-key fragments, k being less than n.

5. The method of claim 1 wherein dividing the encryption key into n encryption-key fragments according to an algorithm that enables reconstruction of the encryption key from k of the encryption-key fragments includes dividing the encryption key into n encryption-key fragments according to an erasure coding algorithm that enables reconstruction of the encryption key from k of the encryption-key fragments, k being less than n.

6. The method of claim 1, wherein the name is generated by applying a hashing algorithm to a combination of the identifier associated with the data object and the unique identifier for the computer memory storage system that is being requested to store the at least one of the encryption key fragments.

7. The method of claim 1 wherein transmitting, to the computer memory storage systems, requests to store the encryption-key fragments that bear access control hallmarks for controlling access to the encryption-key fragment includes:
generating the requests to store the encryption-key fragments at a computing system;
signing the requests to store the encryption-key fragments using a private key associated with the computing system; and
transmitting the signed requests to store the encryption-key fragments to the computer memory storage systems.

8. The method of claim 1 wherein the identifier associated with the data object is a uniform resource identifier (URI) such that transmitting, to the computer memory storage systems, requests to store the encryption-key fragments that include indications of the identifier associated with the data object comprises transmitting, to the computer memory storage systems, requests to store the encryption-key fragments that include indications of the URI associated with the data object.

9. The method of claim 1 wherein the different computer memory storage systems comprise different data centers that are different from and physically remote from each other such that transmitting requests to store different ones of the encryption-key fragments to different computer memory storage systems includes transmitting requests to store different ones of the encryption-key fragments to different data centers that are different from and physically remote from each other.

10. The method of claim 9 wherein transmitting requests to store different ones of the encryption-key fragments to different data centers that are different from and physically remote from each other comprises transmitting n different requests to store an individual one of the encryption-key fragments to n different data centers, each request to store an encryption-key fragment including a different one of the n encryption-key fragments.

11. The method of claim 9 further comprising:
storing the encryption key in a transient computer memory storage system;
after transmitting the requests to store the encryption-key fragments to the different data centers:
receiving, from some number of data centers to which requests to store encryption-key fragments were transmitted, confirmations that the corresponding encryption-key fragments have been stored,
determining that confirmations, that the corresponding encryption-key fragments have been stored, have been received from a predefined threshold number of the data centers, the predefined threshold being fewer than all of the data centers to which a request to store an encryption-key fragment was transmitted, and
encryption-key fragments have been stored have been received from a predefined threshold number of the data centers to which a request to store an encryption-key fragment was transmitted, deleting the encryption key from the transient computer memory storage system.

12. The method of claim 9 further comprising:
after transmitting the requests to store the encryption-key fragments to the different data centers:
transmitting requests to delete encryption-key fragments corresponding to the identifier associated with the data object to the different data centers;
encryption-key fragments corresponding to the identifier associated with the data object to the different data centers, receiving, from data centers to which requests to delete encryption-key fragments corresponding to the identifier associated with the data object were transmitted, confirmations that encryption-key fragments corresponding to the identifier associated with the data object have been deleted; and
encryption-key fragments corresponding to the identifier associated with the data object have been received from a predefined threshold number of data centers, the predefined threshold number of data centers being fewer than all of the data centers to which requests to delete encryption-key fragments were sent so that the encryption key cannot be reconstructed.

13. The method of claim 1 wherein transmitting requests to store different ones of the encryption-key fragments to different computer memory storage systems includes transmitting requests to store each of the n encryption-key fragments to the computer memory storage systems.

14. A method comprising:
encrypting, by a service center, a data object using an encryption key;
dividing, by the service center, the encryption key into encryption-key fragments such that the encryption key can be reconstructed using fewer than all of the encryption-key fragments;
transmitting, from the service center to respective data centers, store requests to store respective ones of the encryption-key fragments at respective ones of the data centers, each store request comprising:
at least one of the encryption-key fragments; and
a name assigned to the at least one of the encryption key fragments included in the request, the name based upon a combination of the unique identifier for the computer memory storage system that is requested to store the least one of the encryption key fragments included in the request and the data object identifier, wherein retrieval of the at least one of the encryption key fragments of the request is based upon use of the name;
transmitting, from the service center to the respective data centers, retrieve requests to retrieve the respective encryption-key fragments, each retrieve request including the name included in the store request to the respective data center;
receiving, in response to the retrieve requests, at least some of the encryption-key fragments;
reconstructing the encryption key using the received encryption-key fragments; and
decrypting the data object using the reconstructed encryption key.

15. The method of claim 14 wherein each of names is hash of an Uniform Resource Identifier (URI) and a respective data-center identifier that identifies a respective data center to the service center.

16. The method of claim 14 wherein each of the store requests and each of the retrieve requests includes a hallmark of the service center so that a receiving data center can authenticate a retrieve request based on the hallmark included in a previously received store request.

17. A system comprising media encoded with code configured to, when executed by a processor, implement a method including:
encrypting, by a service center, a data object using an encryption key;
dividing, by the service center, the encryption key into encryption-key fragments such that the encryption key can be reconstructed using fewer than all of the encryption-key fragments;
transmitting, from the service center to respective data centers, store requests to store respective ones of the encryption-key fragments at respective ones of the data centers, each store request comprising:
at least one of the encryption-key fragments; and
a name assigned to the at least one of the encryption key fragments included in the request, the name based upon a combination of the unique identifier for the computer memory storage system that is requested to store the least one of the encryption key fragments included in the request and the data object identifier, wherein retrieval of the at least one of the encryption key fragments of the request is based upon use of the name;
transmitting, from the service center to the respective data centers, retrieve requests to retrieve the respective encryption-key fragments, each retrieve request including the name included in the store request to the respective data center;
receiving, in response to the retrieve requests, at least some of the encryption-key fragments;
reconstructing the encryption key using the received encryption-key fragments; and
decrypting the data object using the reconstructed encryption key.

18. The system of claim 17 wherein each of the names is hash of an Uniform Resource Identifier (URI) and a respective data-center identifier that identifies a respective data center to the service center.

19. The system of claim 17 wherein each of the store requests and each of the retrieve requests includes a hallmark of the service center so that a receiving data center can authenticate a retrieve request based on the hallmark included in a previously received store request.

20. The system of claim 17 further including the processor.

\* \* \* \* \*